United States Patent
Fourcault et al.

(10) Patent No.: US 9,270,074 B2
(45) Date of Patent: Feb. 23, 2016

(54) METHOD FOR MANUFACTURING AN OPTICAL FIBRE LASER

(71) Applicant: COMMISSARIAT A L'ENERGIE ATOMIQUE ET AUX ENE ALT, Paris (FR)

(72) Inventors: William Fourcault, Grenoble (FR); Bruno Charrat, Saint-Egreve (FR); Jean-Michel Leger, Villard-Bonnot (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 130 days.

(21) Appl. No.: 14/048,267

(22) Filed: Oct. 8, 2013

(65) Prior Publication Data
US 2014/0109372 A1   Apr. 24, 2014

(30) Foreign Application Priority Data

Oct. 22, 2012   (FR) ..................................... 12 60035

(51) Int. Cl.
*B21D 39/03*   (2006.01)
*B23P 11/00*   (2006.01)
(Continued)

(52) U.S. Cl.
CPC ............. *H01S 3/06704* (2013.01); *H01S 3/102* (2013.01); *H01S 3/0405* (2013.01);
(Continued)

(58) Field of Classification Search
CPC .......... H01S 3/02; B32B 37/12; B32B 37/14; B23P 11/00; Y10T 29/49826; G02B 6/29395; G02B 6/02; G02B 6/4292; G02B 6/03644; G02B 6/2835

USPC ........... 29/428; 385/27, 29, 48, 134, 128, 92, 385/123, 51
See application file for complete search history.

(56) References Cited

U.S. PATENT DOCUMENTS 3,944,328 A * 3/1976 Kent et al. ........................ 385/70
4,196,965 A * 4/1980 Matsuno .......................... 385/96
(Continued)

FOREIGN PATENT DOCUMENTS

WO    WO 2009/155707 A1    12/2009

OTHER PUBLICATIONS

Z.E. Harutjunian, et al., "Single polarisation twisted distributed feedback fibre laser" Electronics Letters, vol. 32, No. 4, XP006004717, Feb. 15, 1996, pp. 346-348.
(Continued)

*Primary Examiner* — David Angwin
(74) *Attorney, Agent, or Firm* — Oblon, McClelland, Maier & Neustadt, L.L.P.

(57) ABSTRACT

The laser comprising an optical fiber having two ends of which a first whereby the light is to be received, and a doped section for absorbing at least part of the light received via the first end and emitting light, the method includes: applying a torsion angle to the optical fiber; supplying light having a pump power at the first end of the optical fiber; checking that the Polarization Extinction Ratio of the light output from the first end of the optical fiber remains greater than a predetermined value throughout a predetermined range of the pump power; and, if the Polarization Extinction Ratio remains greater than the predetermined value throughout the predetermined range of the pump power, attaching the optical fiber to a mechanical mount at two attachment points of the optical fiber situated on either side of the doped section, with the torsion angle applied to the optical fiber.

10 Claims, 2 Drawing Sheets

(51) Int. Cl.
   *G02B 6/26*    (2006.01)
   *G02B 6/42*    (2006.01)
   *G02B 6/00*    (2006.01)
   *G02B 6/032*   (2006.01)
   *H01S 3/067*   (2006.01)
   *H01S 3/102*   (2006.01)
   *H01S 3/10*    (2006.01)
   *H01S 3/04*    (2006.01)
   *H01S 3/0941*  (2006.01)

(52) U.S. Cl.
   CPC .......... *H01S 3/0675* (2013.01); *H01S 3/06712* (2013.01); *H01S 3/09415* (2013.01); *H01S 3/10061* (2013.01); *Y10T 29/49826* (2015.01)

(56) References Cited

U.S. PATENT DOCUMENTS

| | | | |
|---|---|---|---|
| 4,537,468 A * | 8/1985 | Degoix et al. | 385/96 |
| 5,384,875 A * | 1/1995 | Shannon et al. | 385/51 |
| 5,479,548 A * | 12/1995 | Cote et al. | 385/51 |
| 6,681,068 B2 * | 1/2004 | Goto et al. | 385/49 |
| 6,865,316 B1 * | 3/2005 | Pratt | 385/29 |
| 2001/0016106 A1 * | 8/2001 | Wagoner et al. | 385/140 |
| 2002/0131757 A1 * | 9/2002 | Chan et al. | 385/140 |
| 2003/0103753 A1 * | 6/2003 | Cabot et al. | 385/135 |
| 2004/0165855 A1 * | 8/2004 | Lee et al. | 385/137 |
| 2006/0062532 A1 * | 3/2006 | Reith et al. | 385/123 |
| 2007/0206909 A1 * | 9/2007 | Wetter et al. | 385/92 |
| 2007/0217738 A1 * | 9/2007 | Anderegg et al. | 385/29 |
| 2009/0067795 A1 * | 3/2009 | DiGiovanni et al. | 385/128 |
| 2011/0110625 A1 * | 5/2011 | Chatigny | 385/29 |
| 2011/0249935 A1 * | 10/2011 | Hu | 385/27 |
| 2014/0109372 A1 * | 4/2014 | Fourcault et al. | 29/428 |

OTHER PUBLICATIONS

Erlend Ronnekleiv, et al., "Modeling of Polarization-Mode Competition in Fiber DFB Lasers", IEEE Journal of Quantum Electronics, vol. 34, No. 9, XP011052024, Sep. 1, 1998, pp. 1559-1569.

H. Y. Kim, et al., "Polarization properties of a twisted fiber laser", Optics Letters, vol. 20, No. 4, XP55055775, Feb. 15, 1995, pp. 386-388.

French Preliminary Search Report and Written Opinion issued Mar. 26, 2013, in French 1260035, filed Oct. 22, 2012 (with English Translation of Categories of Cited Documents).

* cited by examiner

METHOD FOR MANUFACTURING AN OPTICAL FIBRE LASER

The invention relates to a method for manufacturing an optical fibre laser.

BACKGROUND OF THE INVENTION

The invention applies more particularly, but not exclusively, to the field of Distributed Feedback Lasers (DFL) or Distributed Bragg Reflectors (DBR), intended to operate at ambient pressure or in a vacuum, as for space applications for example.

DESCRIPTION OF THE PRIOR ART

However, some known optical fibre lasers exhibit unstable behaviour characterised by a change over time in the polarisation direction of the light beam at the laser output.

In this way, a solution to this instability problem may be sought.

SUMMARY OF THE INVENTION

For this purpose, the invention relates to a method for manufacturing an optical fibre laser comprising an optical fibre having two ends, of which a first whereby the light is to be received, and a doped section for absorbing at least one portion of the light received via the first end and emitting light, the method comprising:

applying a torsion angle to the optical fibre,
 supplying light having a power referred to as the pump power at the first end of the optical fibre,
 checking that the Polarisation Extinction Ratio of the light output from the first end of the optical fibre remains greater than a predetermined value throughout a predetermined range of the pump power, and
 if the Polarisation Extinction Ratio remains greater than the predetermined value throughout the predetermined range of the pump power, attaching the optical fibre to a mechanical mount at two attachment points of the optical fibre situated on either side of the doped section, with the torsion angle applied to the optical fibre.

Indeed, the inventors discovered that this instability problem was due to the method for manufacturing the optical fibre laser. Indeed, in the usual manufacturing method, an operating point essentially determined by the torsion angle is sought in accordance with defined specifications and the optical fibre is glued into this position.

However, the inventors ascertained that the slightest modification of the pump power could give rise to a shift in the operating point, and thus the instability described above.

By means of the method according to the invention, it is checked that the optical fibre output remains correctly polarised throughout a pump power range, and not for only one value. In this way, when the optical fibre laser is used with a nominal pump power within the previous range, the output polarisation of the laser remains stable even in the event of fluctuations in the pump power relative to the nominal value thereof.

Optionally, the predetermined range of the pump power is covered by stages.

Optionally, the light is supplied at the first end of the optical fibre by a diode.

Optionally, the diode is supplied with electricity, referred to as the pump current, and the predetermined range of the pump power is covered by stages, by having the pump current covering in stages a predetermined range, the stages being separated from each other by not more than 10 mA, preferably by not more than 8 mA.

Optionally, the changeover from one stage to the next is carried out at a rate of not more than 10 mA/s, and preferably not more than 5 mA/s.

Optionally, the torsion angle is that for which the Polarisation Extinction Ratio is the highest.

Optionally, the method further comprises, for each of a plurality of torsion angles, referred to as secondary torsion angles, within a predetermined angular range defined on the basis of the torsion angle and comprising the torsion angle: applying the secondary torsion angle to the optical fibre; and checking that the Polarisation Extinction Ratio remains greater than the predetermined value over the predetermined range of the pump power.

Optionally, the predetermined angular range is ±90° relative to the torsion angle.

Optionally, when the mechanical mount comprises a trough into which the doped section of the optical fibre runs once the optical fibre is attached to the mechanical mount, attaching the optical fibre to the mechanical mount may be followed by coating the doped section with a heat-conducting material, the coating being performed by filling the trough with heat-conducting material.

Optionally, filling the trough with heat-conducting material may be carried out drop by drop so as to minimise air bubble formation.

The invention also relates to an optical fibre laser obtained by means of a method according to the invention, further comprising a heat-conducting material coating at least the doped section of the optical fibre.

Indeed, the optical fibre laser described in publication No. US 2002/0181908 A1 comprises an optical fibre having two ends of which a first whereby the light is to be received, and a doped section for absorbing at least one portion of the light received via the first end and emitting light. The light is supplied by a diode, referred to as a pump diode.

The inventors observed that, under certain conditions, such an optical fibre laser could exhibit unstable behaviour characterised by a drop in optical power at the laser output and a significant increase in the wavelength of the light beam at the laser output.

The inventors discovered that this instability problem was due to overheating of the optical fibre at the doped section. This overheating occurs when the optical fibre laser is used in air at atmospheric pressure, but to a limited extent since the heat produced in the optical fibre is dissipated firstly by conduction, secondly by convection in the air, and, to a lesser degree, by radiation. However, when the optical fibre laser is used in a vacuum, only dissipation by radiation and conduction along the optical fibre are possible, which may be insufficient when the light power supplied by the diode, referred to as the pump power, is high, for example greater than some tens of milliwatts, and the wavelength of the doped section of the optical fibre does not exceed a few centimetres, according to the laser performances sought.

On the contrary, in an optical fibre laser according to the invention, the heat-conducting material is suitable for dissipating the heat produced in the optical fibre, rendering the behaviour of the optical fibre laser more stable.

Optionally, at least one portion of the light emitted by the doped section of the optical fibre is intended to be output via the first end of the optical fibre, and the optical fibre laser further comprises: a diode for emitting light to the first end of the optical fibre; and an optical multiplexer comprising one input whereby the optical multiplexer is to receive the light emitted by the diode, one input/output for transmitting the light from the diode to the first end of the optical fibre, and receiving the light from the first end of the optical fibre, and one output for transmitting the light received by the input/output of the optical multiplexer from the first end of the optical fibre.

BRIEF DESCRIPTION OF THE DRAWINGS

The invention will be understood more clearly using the description hereinafter, given merely as an example and with reference to the appended figures wherein.

DESCRIPTION OF THE PREFERRED EMBODIMENTS

Figure 1:
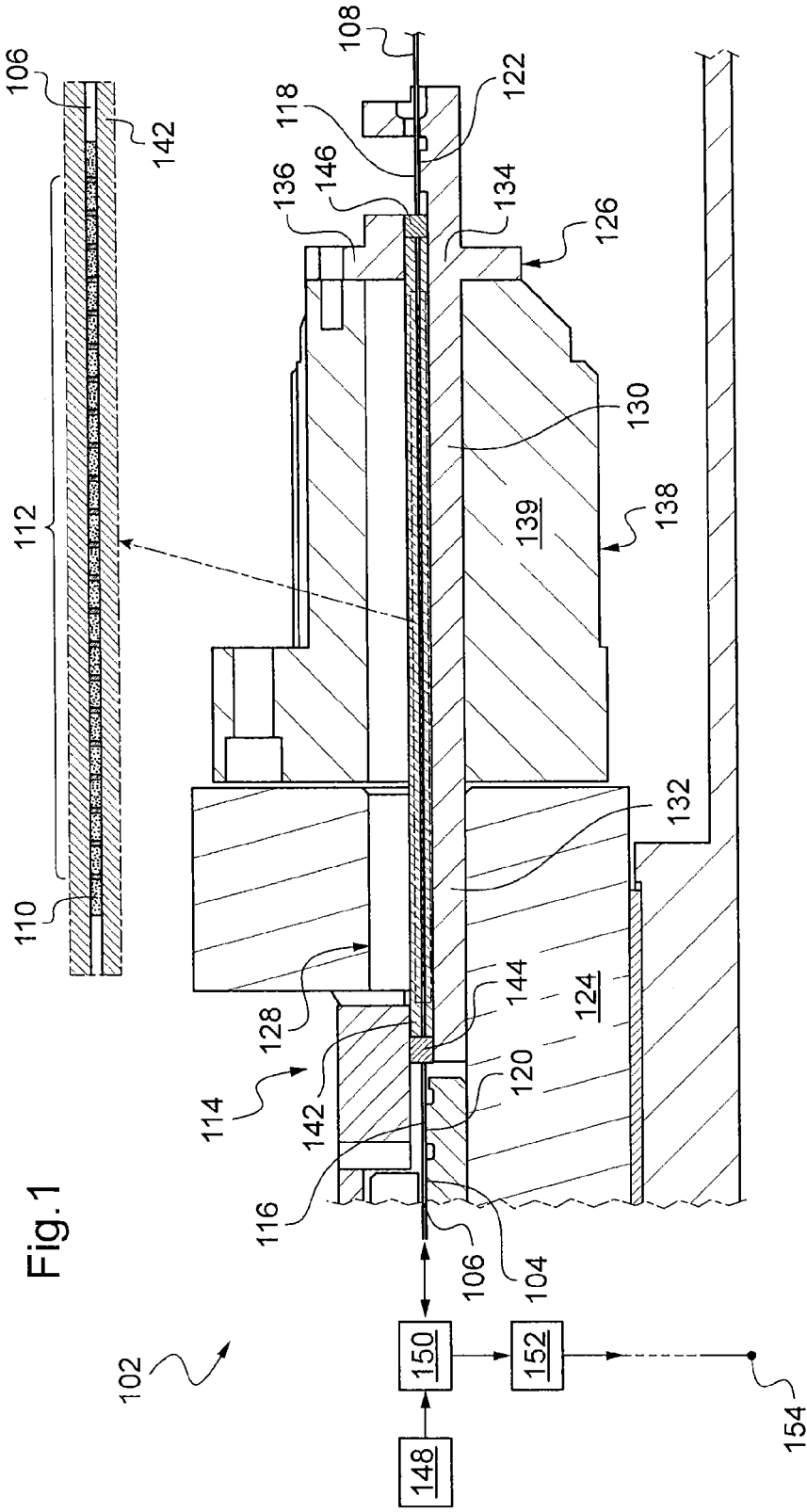
FIG. 1 schematically represents the general structure of an optical fibre laser according to one embodiment of the invention.

With reference to FIG. 1, an optical fibre laser 102 implementing the invention will now be described. In the example described, the laser 102 is a longitudinal single-mode laser.

The laser 102 firstly comprises an optical fibre 104. The optical fibre 104 has, in a manner known per se, a core and cladding around the core, the refractive index of the cladding being lower than that of the core. The core and cladding are encased by a protective sheath. The optical fibre 104 is provided with two ends 106, 108, of which a first 106 is intended to allow light to flow in both directions of propagation: to and from the optical fibre 104. The optical fibre 104 has, between the two ends 106, 108 thereof, a doped section 110 for, in a manner known per se, absorbing at least a portion of the light received by the first end 106 of the optical fibre 104 and emitting light, particularly to said first end 106, the light emitted generally having a continuous wavelength range. The optical fibre 104 is for example doped with rare earth ions, such as erbium ($Er^{3+}$), neodymium ($Nd^+$), ytterbium ($Yb^+$), thulium ($Tm^+$), or praseodymium ($Pr^+$).

The optical fibre 104 further comprises a Bragg grating 112 situated in the example described in the doped section 110 and formed from variations of the refractive index of the core along the optical fibre 104. The Bragg grating 112 is intended to filter the light emitted by the doped section 110 so as to only allow a portion having a predetermined wavelength through. In this way, when the light received by the end 106 has a wavelength of 980 nm, the light emitted by the doped section has a range of wavelengths of about 1050 nm, and the light output by this end 106 has a wavelength in this range, between 1000 and 1100 nm according to the pitch of the Bragg grating, for example 1083 nm in the example described.

Alternatively, two Bragg gratings situated on either side of the doped section could be used instead of the Bragg grating 112.

The laser 102 further comprises a mechanical mount 114 to which the optical fibre 104 is attached at two attachment points 116, 118 situated on either side of the doped section 110. On the other hand, in the example described, the optical fibre 104 is not attached to the mechanical mount 114 between the two attachment points 116, 118. The attachment point 116 situated on the side of the end 106 of the optical fibre 104 is referred to as the "proximal attachment point", whereas the other 118 is referred to as the "distal attachment point". The mechanical mount 114 keeps the optical fibre 104 taut and twisted between the two attachment points 116, 118. In the example described, the attachment points 116, 118 are at a distance of at least 6 cm.

The mechanical mount 114 is formed from a plurality of parts attached to each other, for example by gluing. These parts may expand together or independently of each other according to the temperature. Hereinafter, in order to simplify the description, only the main assemblies will be described, and not the details of the parts attached together.

In this way, in order to attach the attachment points 116, 118, in the example described, the mechanical mount 114 comprises a first portion 124 to which the proximal attachment point 116 is attached, and a second portion 126 to which the distal attachment point 118 is attached. The portions 124, 126 of the mechanical mount 114 are movable relative to each other so as to be separated from each other to tighten or slacken the optical fibre 104 between the attachment points 116, 118. In the example described, the attachment points 116, 118 are glued to the mechanical mount 114 on two gluing areas 120, 122, respectively, referred to as proximal and distal, respectively.

The first portion 124 of the mechanical mount 114 is perforated with an opening 128.

The second portion 126 of the mechanical mount 114 comprises a trough 130 having a first end 132 whereby the trough 130 is inserted into the opening 128, and a second end 134 provided with a shoulder 136. The optical fibre 104, and particularly the doped section 110, runs into the trough 130.

The mechanical mount 114 further comprises a separating device 138 for separating the first and second portions 124, 126 of the mechanical mount 114. In the example described, the separating device 138 comprises a piezoelectric strut 139 inserted between the first portion 124 of the mechanical mount 114 and the shoulder 136 of the second portion 126 of the mechanical mount 114. The separating device 138 is suitable for offsetting the expansions of the parts of the laser 102 so that the Bragg grating 112 retains a constant pitch over time when the laser 102 is situated in a medium wherein the temperature is liable to vary over time.

The mechanical mount 114 further comprises a heat-conducting material 142 filling the trough 130 so as to cover the portion of the optical fibre 104 running into the trough 130, and therefore particularly the doped section 110. This means that, in the trough 130, the optical fibre 104 is embedded in the heat-conducting material 142. In this way, the entire outer surface of the doped section 110 is in direct contact with the heat-conducting material 142, facilitating heat exchange from the doped section 110 to the heat-conducting material 142.

To promote heat exchange further, the heat-conducting material 142 preferably has a thermal conductivity of at least 0.1 $W \cdot m^{-1} \cdot K^{-1}$, for example at least 0.2 $W \cdot m^{-1} \cdot K^{-1}$.

Preferably, the heat-conducting material 142 is devoid of air bubbles. Indeed, the presence of air bubbles would impede and disturb heat dissipation, as such allowing a temperature gradient to appear, conveyed by an inhomogeneous Bragg grating 112 and thus a potentially unstable wavelength at the output of the laser 102.

Preferably, the heat-conducting material 142 is soft, i.e. it has a hardness of less than 20 Shore A. Also preferably, the heat-conducting material 142 is ductile, i.e. it is suitable for being deformed without breaking. In this way, by being soft and ductile, the heat-conducting material 142 enables the doped section 110 to shrink and expand according to the environment of the laser 102.

Also preferably, the heat-conducting material 142 is adhesive. In this way, the heat-conducting material 142 remains in position more readily during the lifetime of the laser 102.

In the example described, the heat-conducting material 142 was polymerised after being inserted into the trough 130.

Preferably, the heat-conducting material 142 has a viscosity before polymerisation less than 4 Pa·s, preferably less than 3 Pa·s. In this way, when inserted into the trough 130, the heat-conducting material 142 is sufficiently fluid to reduce the risk of air bubble formation.

Preferably, the heat-conducting material 142 is a polymerised silicone gel, for example the gel sold under the reference CV-8151 by NuSil Silicone Technology. This gel can be handled for 30 hours once removed from the original container, avoiding time constraints during the manufacture of the laser 102.

The laser 102 further comprises two plugs 144, 146 sealing the trough 130 on each side in order to contain the heat-conducting material 142 in the trough 130. In the example described, the plugs 144, 146 are made of grease, for example of the MAPSIL 210 type, or of flexible adhesive, for example of the CV1-1142 silicone adhesive type.

The laser 102 further comprises a diode 148 for emitting light. The light emitted by the diode 148 has a primary wavelength of 980 nm in the example described and light power, referred to as the pump power. In the example described, the diode 148 is supplied with constant voltage and a current, referred to as the pump current, controlled so as to be able to adopt various values. The pump power is dependent on the pump current and it is simply necessary to modify the latter to modify the pump power.

The laser 102 further comprises an optical multiplexer 150 having, firstly, an input for receiving the light emitted by the diode 148. The multiplexer 150 further has an input/output for transmitting the light received from the diode 148 to the end 106 of the optical fibre 104, and receiving the light from the end 106 of the optical fibre 104. In the example described, the output light has a wavelength of 1083 nm. This shift in the wavelength enables the optical multiplexer 150 to separate the light from the optical fibre 104 from the light from the diode 148. The optical multiplexer 150 further has an output, different to the input thereof, for transmitting the light received on the input/output thereof, i.e. from the end 106 of the optical fibre 104.

The laser 102 further comprises an optical insulator 152 having an input for receiving the light emitted by the output of the multiplexer 150, and an output for transmitting this light to an output 154 of the laser 102. The function of the optical insulator 152 is that of enabling the propagation of the light from the input to the output thereof, but preventing the propagation of the light from the output to the input thereof.

Figure 2:
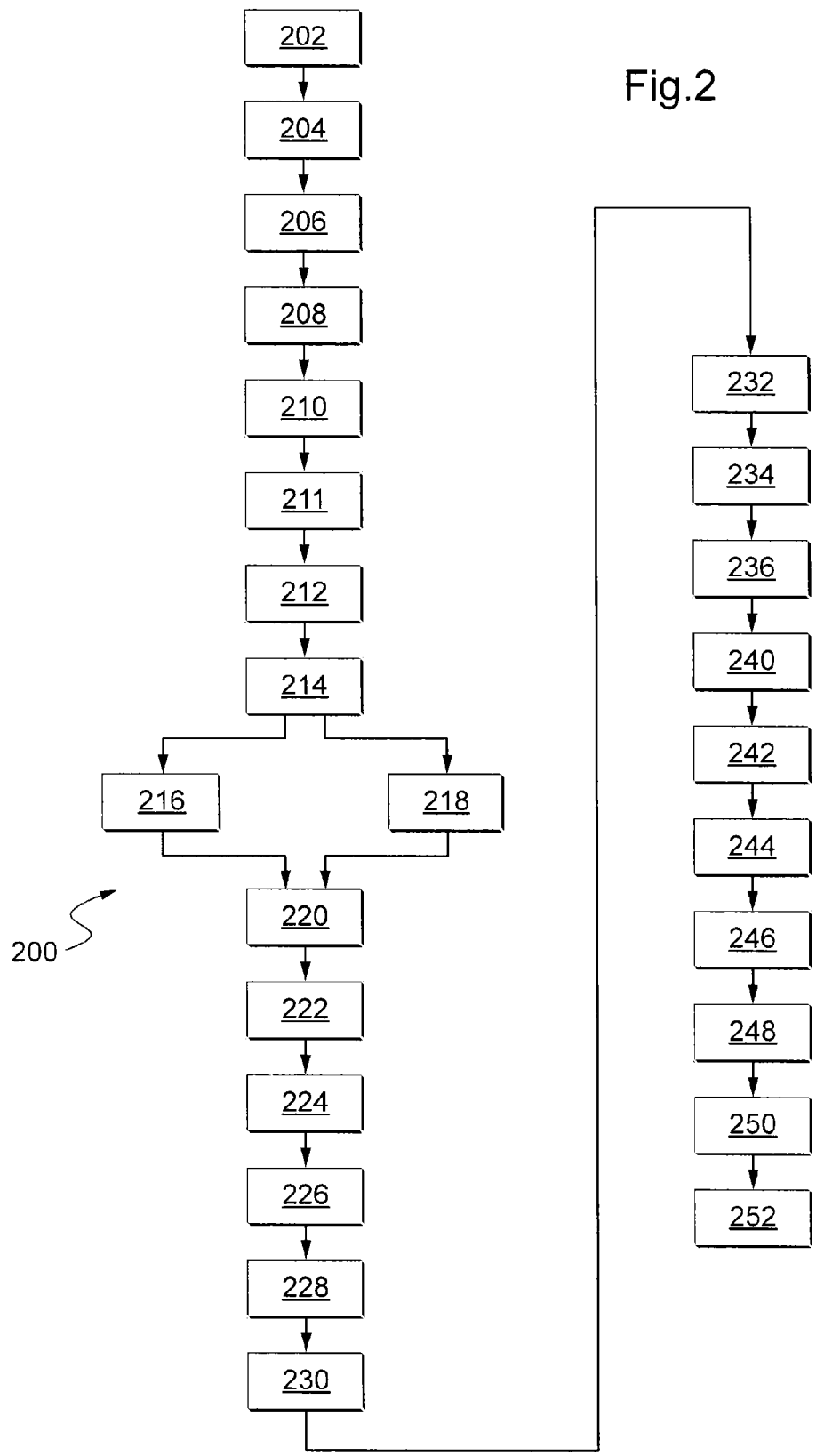
FIG. 2 illustrates the successive steps of a method for manufacturing the optical fibre laser in FIG. 1 according to one embodiment of the invention.

With reference to FIG. 2, a method 200 for manufacturing the laser 102 in FIG. 1 will be described hereinafter.

During a step 202, the mechanical mount 114 is subjected to at least one thermal cycle, i.e. at a temperature varying between a predetermined low temperature, preferably less than 0° C., for example −20° C., and a predetermined high temperature, preferably greater than 30° C., for example 60° C. Preferably, the temperature variation is carried out in dry air, i.e. with a relative humidity less than 10%, preferably less than 5%. This step makes it possible to stabilise the mechanical mount 114, i.e. prevent the parts of the mechanical mount 114 from moving subsequently relative to each other. Indeed, such a movement could be detrimental to the proper operation of the laser 102. For example, a movement as slight as 1 μm could give rise to a shift in the wavelength of the laser 102 of some ten picometres.

During a step 204, the diode 148 is connected to the optical fibre 104 such that the latter can receive light emitted by the diode 148. As such, in the example described, this means that the end 106 of the optical fibre 104 is soldered to the input/output of the optical multiplexer 150, and the input thereof is connected to the output of the diode 148.

During a step 206, the optical fibre 104 is placed in the mechanical mount 114, particularly in such a way that the doped section 110 is situated in the trough 130 and centred therein. However, the optical fibre 104 is not attached to the mechanical mount 114 at this stage. Magnetised jaws not shown and situated on either side of the doped section 110 of the optical fibre 104 are then closed onto the optical fibre 104 to hold the latter in position, particularly in the trough 130 of the mechanical mount 114. The magnetised jaws are thus situated on either side of the doped section 110 of the optical fibre 104 and generally separated from each other by at least 30 cm.

During a step 208, the diode 148 is lit by supplying pump current thereto so that it emits light which reaches the optical fibre 104, the doped section 110 thereof thus being pumped until a sought nominal power is obtained at the output of the optical multiplexer 150.

During a step 210, the optical fibre 104 is progressively stretched by separating the magnetised jaws from each other until a sought wavelength at the output of the optical multiplexer 150 is obtained.

During a step 211, the Polarisation Extinction Ratio or PER, at the output of the end 106 of the optical fibre 104 is evaluated and compared to a predetermined value, for example 15 dB. In the example described, this evaluation is carried out by measuring the PER at the output of the optical multiplexer 150, as this does not change the polarisation of the light beam. In a manner known per se, the PER makes it possible to quantify the polarisation rate of the light beam.

If the PER is less than the predetermined value, for example 15 dB, experience shows that the likelihood of obtaining a suitable and stable operating point with the optical fibre is low. As such, it is preferable to return to step 204 with another optical fibre.

During a step 212, torsion is progressively applied to the optical fibre 104 between the two magnetised jaws 120, 122 according to a torsion angle. Preferably, the torsion angle is kept below three revolutions. At the same time, the PER at the output of the end 106 of the optical fibre 104 is evaluated, again while measuring it at the output of the optical multiplexer 150.

During a step 214, the torsion angle between the two magnetised jaws offering the optimum, i.e. the highest, PER, is determined. This torsion angle is referred to as the "optimum torsion angle".

During a step 216, with the optical fibre 104 being kept, by means of the magnetised jaws, in the mechanical mount 114 stretched and twisted at the optimum torsion angle, it is checked that the PER remains greater than a predetermined value, for example 15 dB, over a predetermined pump power range, consisting, in the example described, of a predetermined range of the pump current. For this purpose, the pump current is monitored so as to cover the predetermined range, while measuring the PER at the output of the end 106 of the optical fibre 104. Preferably, during the step 216, the predetermined range of the pump current is covered in stages, a stage being defined in the example described as a period of at least 30 s, preferably at least 60 s, during which the pump current is constant within one per cent relative to a mean value. Also preferably, the stages are mutually separated by not more than 10 mA, preferably not more than 8 mA. Even more preferably, the change from one stage to the next takes place at a rate of not more than 10 mA·s$^{-1}$, and preferably not more than 5 mA·s$^{-1}$.

If the PER falls below 15 dB within the predetermined pump current range, this means that the beam emitted by the end 106 of the optical fibre 104 is not polarised correctly in a rectilinear manner and that, if the optical fibre 104 was retained with this optimum torsion angle, there would be a risk of polarisation mode hopping for the laser 102. For this reason, in this case, the method returns to the step 214, where the angle giving the next optimum PER is selected as the optimum torsion angle. Alternatively, the method returns to the step 202 with another optical fibre.

During a step 218, parallel with the step 216, it is checked that the output laser beam is still longitudinal single-mode, while the optical fibre 104 is stretched and twisted. A Fabry-Perot interferometer is for example used to conduct this check.

During a step 220, it is checked that the PER remains greater than the predetermined value over the predetermined pump current range and that the output laser beam remains longitudinal single-mode for a plurality of torsion angles between the two magnetised jaws, referred to as secondary torsion angles, within a predetermined angular range defined on the basis of the optimum torsion angle and comprising the optimum torsion angle. The predetermined angular range is for example ±90° relative to the optimum torsion range. Preferably, the secondary torsion angles include at least the angles ±45° and/or ±90° relative to the optimum torsion range. For this purpose, the steps 216 and 218 are for example repeated for each of the second torsion angles. If the check is positive, this means that the optimum torsion angle indeed defines a stable operating point of the optical fibre 104.

During a step 222, the optical fibre 104 is removed from the mechanical mount 114 and the points of the optical fibre 104 that were situated, prior to the removal thereof, opposite the bonding areas 120, 122 are stripped (removal of protective sheath), so as to form the attachment points 116, 118.

During a step 224, the optical fibre 104 is again placed in the mechanical mount 114 as in the step 206, by positioning the attachment points 116, 118 against the bonding areas 120, 122, respectively.

During a step 226, the optimum torsion angle is applied to the optical fibre 104. The optical fibre 104 is again held in this position by means of the magnetised jaws.

During a step 228, it is again checked that the PER remains greater than the predetermined value over the predetermined pump current range and that the laser beam remains longitudinal single-mode.

During a step 230, the distal attachment point 118 is glued to the distal bonding area. The adhesive is for example a UV cross-linking epoxy adhesive.

During a step 232, while holding the optimum torsion angle, the optical fibre 104 is stretched, as in the step 210.

During a step 234, the proximal attachment point 116 is glued to the proximal bonding area 120.

As the adhesive is applied directly onto the cladding, there is no risk of slipping with the protective sheath.

During a step 236, the adhesive is left to stand for the time required for the polymerisation and stabilisation thereof.

During a step 240, the two plugs 144, 146 are respectively placed at the ends of the trough 130.

In the case of grease, the two plugs 144, 146 are preferably observed from various angles using, optionally, a binocular instrument, to see whether they will be gel-tight (at a very low viscosity). In the case of grease, the plugs 144, 146 are preferably slightly compressed.

During a step 242, the portion of the optical fibre 104 running into the trough 130, between the two plugs 144, 146, and thus particularly the doped section 110, is coated with a heat-conducting material 142 by filling the trough 130 with heat-conducting material 142. The step 242 is carried out so as to minimise air bubble formation in the heat-conducting material 142.

In the example described, the step 242 comprises the following steps. During a step 242-1, the mechanical mount 114 is inclined on one side of one of the plugs 144, 146. For example, the inclination is between 5° and 10° relative to the horizontal. For example also, the inclination is obtained using a wedge.

During a step 242-2, some heat-conducting material 142 is placed in a small container, so as to be able to collect drops with a small needle.

During a step 242-3, the heat-conducting material 142 is deposited gently, using the small needle, drop by drop, from the small containers, into the trough 130 until the heat-conducting material reaches the lower plug.

During a step 242-4, the mechanical mount 114 is positioned flat, such that optical fibre 104 extends horizontally. The flat positioning is for example carried out using a spirit level.

During a step 242-5, drops of heat-conducting material are injected into the trough 130 until said trough is filled, particularly until the conducting material reaches the other plug (that in the upper position when the trough 130 was inclined).

To perform the step 242, it is preferable to work in a clean atmosphere, such as a clean room, with a head cover and gloves. The tools required for applying the gel, such as the syringe, needle for depositing drops of gel, small containers, etc. are preferably previously cleaned with lint-free paper wipes soaked in alcohol, for example isopropyl alcohol.

During a step 244, the heat-conducting material 142 is stabilised in the trough 130 leaving the mechanical mount flat for a predetermined period of at least 1 hour.

During a step 246, when the predetermined period has elapsed, it is checked that the optical fibre 104 is actually immersed in the heat-conducting material and that the latter has not flowed elsewhere. If required, some drops of heat-conducting material are added.

During a step 248, while the mechanical mount 114 is still flat, the heat-conducting material 142 is polymerised. The polymerisation is carried out, depending on the type of heat-conducting material 142, in an incubator or under UV or according to the suitable polymerisation method.

During a step 250, it is checked that the heat-conducting material 142 is suitably polymerised. For example, the check is carried out using a control vessel subjected to the same polymerisation procedure. It is also checked that the heat-conducting material 142 is found all over the peripheries of the optical fibre 104 in the trough 130.

During a step 252, various functional tests of the laser 102 are carried out. These tests include for example one or a plurality of the following tests: checking that the output power of the laser 102 varies as a function of the pump current according to a predetermined gauge, checking that the output wavelength of the laser 102 varies as a function of the pump current according to a predetermined gauge, checking that the PER varies as a function of the pump current according to a predetermined gauge, checking the output power stability of the laser 102 for a predetermined period of at least 1 hour.

It is obvious that an optical fibre laser such as that described above is suitable for dissipating the heat produced in the optical fibre, towards the outside thereof. In this way, a constant Bragg grating pitch may be obtained along the optical fibre, enhancing the spectral and intensity performances of the laser.

It should be further noted that the invention is not restricted to the embodiment described above. Indeed, it would be obvious to those skilled in the art that various modifications may be made to the embodiment described above. In the claims hereinafter, the terms used should not be interpreted as limiting the claims to the embodiment disclosed in the present description, but should be interpreted to include any equivalents intended to be covered by the claims due to the wording thereof and which could be envisaged by those skilled in the art by applying their general knowledge to the implementation of the teaching disclosed above.

The invention claimed is:

1. A method for manufacturing an optical fibre laser comprising a mechanical mount and an optical fibre attached to the mechanical mount at two attachment points, the method comprising:

obtaining an optical fibre having a first end and a second end with light to be received via the first end, the optical fibre having a doped section for (i) absorbing at least one portion of the light received via the first end and (ii) emitting light to the first end so that light is output through the first end, applying a torsion angle to the optical fibre, supplying light having a power referred to as a pump power at the first end of the optical fibre, measuring a Polarisation Extinction Ratio of the light output from the first end of the optical fibre throughout a predetermined range of the pump power, verifying if the Polarization Extension Ratio remains greater than a predetermined value throughout the predetermined range of the pump power, and if the Polarisation Extinction Ratio remains greater than the predetermined value throughout the predetermined range of the pump power, attaching the optical fibre to a mechanical mount at two attachment points of the optical fibre, a first attachment point being situated on a first side of the doped section, a second attachment point being situated on a second side of the doped section, with the torsion angle applied to the optical fibre, and producing the optical fibre laser comprising the mechanical mount and the optical fibre attached to the mechanical mount at the two attachment points, with the torsion angle applied to the optical fibre.

2. The method as claimed in claim 1, wherein the predetermined range of the pump power is covered by stages.

3. The method as claimed in claim 1, wherein the light is supplied at the first end of the optical fibre by a diode.

4. The method as claimed in claim 3, wherein the diode is supplied with electricity, referred to as a pump current, and wherein the predetermined range of the pump power is covered by stages, by having the pump current covering in stages a predetermined range, the stages being separated from each other by not more than 10 mA, preferably by not more than 8 mA.

5. The method as claimed in claim 4, wherein changeover from one stage to the next is carried out at a rate of not more than 10 mA/s, and preferably not more than 5 mA/s.

6. The method as claimed in claim 1, wherein the torsion angle is that for which the Polarisation Extinction Ratio is the highest.

7. The method as claimed in claim 1, further including, for each of a plurality of torsion angles, referred to as secondary torsion angles, within a predetermined angular range defined on the basis of the torsion angle and comprising the torsion angle:

applying the secondary torsion angle to the optical fibre (104), and checking that the Polarisation Extinction Ratio remains greater than the predetermined value over the predetermined range of the pump power.

8. The method as claimed in claim 7, wherein the predetermined angular range is ±90° relative to the torsion angle.

9. The method as claimed in claim 1, wherein, since the mechanical mount includes a trough into which the doped section of the optical fibre runs once the optical fibre is attached to the mechanical mount, attaching the optical fibre to the mechanical mount is followed by coating the doped section with a heat-conducting material, the coating being performed by filling the trough with heat-conducting material.

10. The method as claimed in claim 9, wherein filling the trough with heat-conducting material is carried out drop by drop so as to minimize air bubble formation.

* * * * *